US011265731B1

(12) United States Patent  
Greenough

(10) Patent No.: US 11,265,731 B1  
(45) Date of Patent: Mar. 1, 2022

(54) SMALL CELL TELECOMMUNICATIONS NETWORK DESIGN

(71) Applicant: Vanu, Inc., Lexington, MA (US)

(72) Inventor: Justin Greenough, Boston, MA (US)

(73) Assignee: Vanu, Inc., Lexington, MA (US)

( * ) Notice: Subject to any disclaimer, the term of this patent is extended or adjusted under 35 U.S.C. 154(b) by 0 days.

(21) Appl. No.: 16/784,089

(22) Filed: Feb. 6, 2020

Related U.S. Application Data

(60) Provisional application No. 62/802,400, filed on Feb. 7, 2019.

(51) Int. Cl.
| | |
|---|---|
| *H04W 16/22* | (2009.01) |
| *H04W 16/18* | (2009.01) |
| *H04W 24/02* | (2009.01) |
| *H04W 36/18* | (2009.01) |
| *H04W 16/24* | (2009.01) |
| H04W 84/10 | (2009.01) |

(52) U.S. Cl.  
CPC ........... *H04W 16/18* (2013.01); *H04W 16/24* (2013.01); *H04W 24/02* (2013.01); *H04W 36/18* (2013.01); *H04W 84/10* (2013.01)

(58) Field of Classification Search  
CPC ..... H04W 16/22; H04W 16/18; H04W 16/32; H04W 52/18; H04W 84/00; H04W 24/04; H04W 40/16; H04W 40/10; H04W 84/18; H04L 41/12; H04L 41/147; H04L 41/145; H04L 43/08; H04L 12/42; H04L 41/22; H04L 45/122; Y02D 70/326; Y02D 70/1222; Y02D 70/34; Y02D 30/70; Y02D 70/142; Y02D 70/144; Y02D 70/22; Y02P 90/02; Y02P 90/20; Y02P 90/18; Y02P 90/26; Y02P 90/185

See application file for complete search history.

(56) References Cited

U.S. PATENT DOCUMENTS

| | | | | |
|---|---|---|---|---|
| 9,560,531 | B1 * | 1/2017 | Chang | .................... H04W 52/18 |
| 2008/0025208 | A1 * | 1/2008 | Chan | ....................... H04L 12/42 |
| | | | | 370/217 |
| 2009/0059814 | A1 * | 3/2009 | Nixon | ................... H04W 16/18 |
| | | | | 370/254 |
| 2020/0342421 | A1 * | 10/2020 | Ramer | ................... G06Q 50/10 |

\* cited by examiner

*Primary Examiner* — Jung Liu  
(74) *Attorney, Agent, or Firm* — Fish & Richardson P.C.

(57) ABSTRACT

A method for establishing a small cell telecommunications network is provided. The method includes determining a plurality of sets of candidate locations, in which each set includes candidate locations for establishing small cell base transceiver stations to provide wireless network service. Each location in the set is determined by applying a gradient descent process to find a local optimal location. The evaluation criteria in the process can include, e.g., an estimated number of people expected to receive coverage, and/or the cost of operating the base transceiver stations. The plurality of sets are evaluated to determine a set of global optimal locations. The evaluation criteria can include, e.g., the expected revenue generated per unit time minus the cost of operating the base transceiver stations per unit time.

37 Claims, 12 Drawing Sheets

Discrete Gradient Descent 8,312 people covered
minimal site count

US 11,265,731 B1

SMALL CELL TELECOMMUNICATIONS NETWORK DESIGN

RELATED APPLICATIONS

This application claims the benefit of priority under 35 U.S.C. § 119(e) to U.S. provisional patent application 62/802,400, filed on Feb. 7, 2019, the entire contents of which are hereby incorporated by reference

TECHNICAL FIELD

This disclosure generally relates to the design of small cell telecommunications networks.

BACKGROUND

Wireless network companies establish base stations to provide coverage to their customers. The base stations are typically set up where the revenues generated from the existing and potential customers are estimated to be sufficient to support the cost of acquiring and operating the base stations and associated network infrastructures. There are many people in the world who still do not have service from wireless networks because they live in areas where the network companies perceive to have difficulty in recovering the costs of acquiring and operating the network facilities through charging for services. This is especially true in areas where low population density or low income limit the revenue potential of proposed network sites.

SUMMARY

The disclosure generally relates to a system and method for determining optimized (or near optimized) sites or locations for building base transceiver stations that provide wireless network services. For example, the locations can be selected in order to maximize the expected revenue generated per unit time minus the cost of operating the base transceiver stations per unit time. For example, a set of candidate sites can be determined in which each candidate site represents a locally optimized site. Multiple sets of locally optimized candidate sites can be determined, and the multiple sets are evaluated and compared in order to determine a set of globally optimized sites. For example, the base transceiver stations can be configured to provide wireless network services that require handoff from one station to another, or alternatively provide wireless network services that do not require handoff.

The invention is useful for determining optimized sites for small cell base transceiver stations. Each base transceiver station may provide service to a small region (e.g., 1 meter to several thousand meters), and the number of possible choices for the BTS sites grows exponentially as the size of the region serviced by the base transceiver stations increases. For example, several hundred or thousand small cell base transceiver stations may be needed to provide wireless service to a region having an area of several thousand square kilometers, and each base transceiver station can be located in any of thousands of possible sites. Finding the optimal (or nearly optimal) sites from among the billions or trillions of possible combinations of the BTS sties becomes very complicated.

The system 100 can help provide a solution to the question regarding, given a geographical region that does not have wireless coverage, where the base transceiver stations should be located to produce an optimal result. The problem can be simplified by first using the gradient descent method to find a set of local optimal locations for the base transceiver stations. An initial candidate location within the region without wireless coverage is selected, and the gradient descent method is applied to find a locally optimal candidate location for a first base transceiver station. For example, an evaluation function can be used for determining whether a candidate site is a locally optimal site. For example, the evaluation function can represent the potential number of cell phones that will be serviced per unit cost of operating the base transceiver station at that site.

After finding a locally optimal candidate location for the first base transceiver station, the area that receives wireless coverage from the first base transceiver station is removed from the region without wireless coverage. An initial candidate location is selected from the updated region without wireless coverage, and the gradient descent method is applied to find a locally optimal candidate location for a second base transceiver station. The area that receives wireless coverage from the second base transceiver station is removed from the region without wireless coverage, an initial candidate location is selected from the updated region without wireless coverage, and the gradient descent method is applied to find a locally optimal candidate location for a third base transceiver station, and so forth, until the desired coverage for the geographical region is achieved. This produces a first set of locally optimal candidate sites for the base transceiver stations.

For wireless services that require handoff, the evaluation function can include a factor that takes into account of the likelihood of successful handoff between a base transceiver station at the new candidate site and the base transceiver stations at the other candidate sites already identified. For example, after the first candidate location for the first base transceiver station is determined, the gradient descent method is applied to find a second candidate location for the second base transceiver station such that the likelihood of successful handoff between the second base transceiver station and the first base transceiver station satisfies a criterion, such as larger than a specified percentage. After the candidate locations for the first and second base transceiver stations are determined, the gradient descent method is applied to find a third candidate location for the third base transceiver station such that the likelihood of successful handoff between the third base transceiver station and either the first base transceiver station or the second base transceiver station satisfies the criterion, such as larger than the specified percentage, and so forth The process is repeated by using a different initial candidate location, producing a second set of locally optimal candidate sites for the base transceiver stations, and so forth. After producing several (e.g., hundreds or thousands or more) sets of candidate sites for the base transceiver stations, the sets of candidate sites are evaluated to identify a set of globally optimal candidate sites. The evaluation can be based on global criteria, such as maximizing the expected revenue generated from all the base transceiver stations per unit time minus the cost of operating all the base transceiver stations per unit time.

By using the method described above, a network service provider can systematically determine the optimal (or near-optimal) locations for setting up small cell base transceiver stations in order to provide better wireless services to customers at lower costs.

In a general aspect, a method for establishing a small cell telecommunications network is provided. The method includes at at least one data processor, determining a first set of locations for establishing a plurality of small cell base transceiver stations to provide wireless cellular service. The determination of the first set of locations includes: determining, within a first overall region, a first location that is associated with a higher score relative to neighboring locations, in which the score is calculated according to a first function of location that takes into account an estimated number of people in a first coverage region that is expected to have wireless cellular service coverage provided by a first small cell base transceiver station if the first small cell base transceiver station is established and operated at the first location, and the first function also takes into account of a cost associated with the first small cell base transceiver station. The determination of the first set of locations includes determining the first coverage region that is expected to have wireless cellular service coverage provided by the first small cell base transceiver station if the first small cell base transceiver station operated at the first location. The determination of the first set of locations includes determining, within a second overall region, a second location that is associated with a higher score relative to neighboring locations, in which the score is calculated according to the first function that takes into account an estimated number of people in a second coverage region that is expected to have wireless cellular service coverage provided by a second small cell base transceiver station if the second small cell base transceiver station is established and operated at the second location, and the first function also takes into account of the cost associated with the second small cell base transceiver station, and the second overall region is equal to the first overall region excluding the first coverage region. The determination of the first set of locations includes adding the first and second locations to the first set of locations.

Implementations of the method can include one or more of the following features. Determining the first location can include applying a gradient descent process to the first function to determine the first location that is associated with a local maximum score or an approximate local maximum score.

The first function can be based on a parameter that represents a population in the wireless signal coverage region of the small cell base transceiver station, a parameter that represents the operational cost of the small cell base transceiver station, and a parameter that represents an estimated number of wireless devices that will use the service provided by the small cell base transceiver station per person in the wireless signal coverage region.

The first function of location x, denoted by $f1(x)$, can be represented by $$f1(x)=P*M/C+D,$$

in which the parameter P represents a population in the wireless signal coverage region of the small cell base transceiver station, the parameter C represents the operational cost of the small cell base transceiver station, the parameter M represents an estimated number of wireless devices that will use the service provided by the small cell base transceiver station per person in the wireless signal coverage region, and the parameter D represents a case specific factor.

The first function of location x, denoted by $f1(x)$, can be represented by $$f1(x)=(P*M/C+D)*(V/v-1),$$

in which the parameter P represents a population in the wireless signal coverage region (denoted by a parameter S) of the small cell base transceiver station, the parameter C represents the operational cost of the small cell base transceiver station, the parameter M represents an estimated number of wireless devices that will use the service provided by the small cell base transceiver station per person in the wireless signal coverage region S, the parameter D represents a case specific factor, the parameter v represents a minimum overlap in coverage necessary for successful handoff between the small cell base transceiver station and another station, and the parameter V represents a maximum overlap between the wireless signal coverage region S and the wireless signal coverage regions of small cell base transceiver stations established at locations, if any, that have already been determined.

Determining the first set of locations can include: determining a second coverage region that is expected to have wireless cellular service coverage provided by the second small cell base transceiver station if the second small cell base transceiver station is established and operated at the second location; determining, within a third overall region, a third location that is associated with a higher score relative to neighboring locations, in which the score is calculated according to the first function that takes into account an estimated number of people in a third coverage region that has wireless cellular service coverage provided by a third small cell base transceiver station if the third small cell base transceiver station is established and operated at the third location, and the first function also takes into account of the cost associated with the third small cell base transceiver station, and the third overall region is equal to the second overall region excluding the second coverage region; and adding the third location to the first set of locations.

Determining the first set of locations can include iteratively determining locations for additional small cell base transceiver stations, including: determining an (i−1)-th coverage region that is expected to have wireless cellular service coverage provided by an (i−1)-th small cell base transceiver station if the (i−1)-th small cell base transceiver station is established and operated at the (i−1)-th location, i being an integer from 4 to n, n being an integer larger than 4; determining, within an i-th overall region, an i-th location that is associated with a higher score relative to neighboring locations, in which the score is calculated according to the first function that takes into account an estimated number of people in an i-th coverage region that is expected to receive wireless cellular service coverage provided by an i-th small cell base transceiver station if the i-th small cell base transceiver station is established and operated at the i-th location, and the first function also takes into account of a cost associated with the i-th small cell base transceiver station, and the i-th overall region is equal to the (i−1)-th overall region excluding the (i−1)-th coverage region; and adding the i-th location to the first set of locations.

Determining the first set of locations can include: ending the iterative determination of the locations for the additional small cell base transceiver stations when an overall coverage of the i small cell base transceiver stations reaches a predetermined threshold.

The method can include: determining a second set of j locations for establishing a plurality of small cell base transceiver stations to provide wireless cellular service, in which an overall coverage of the j small cell base transceiver stations reaches the predetermined threshold, and at least one of the locations in the second set of j locations is different from the locations in the first set of i locations; applying a network evaluation function to the first set of i locations to generate a first network score, in which the network evaluation function takes into account of a cost associated with microwave links for interconnecting the small cell base transceiver stations established at the first set of i locations; applying the network evaluation function to the second set of j locations to generate a second network score, in which the network evaluation function takes into account of the cost associated with microwave links for interconnecting the small cell base transceiver stations established at the second set of j locations; comparing the first network score to the second network score; and generating an output having information about one of the first and second sets of locations that has a higher network score.

The method can include: iteratively determining additional sets of locations for establishing a plurality of small cell base transceiver stations to provide wireless cellular service; applying the network evaluation function to the additional sets of locations to generate corresponding network scores; determining which set of locations among the sets of locations has the highest network score; and outputting information about the set of locations that has the highest network score.

The method can include establishing small cell base transceiver stations at the locations in the set of locations that has the highest network score.

The network evaluation function can take into account of the number of transactions captured by the set of small cell base transceiver stations per unit time, the cost associated with microwave links that interconnect the small cell base transceiver stations, and a cost associated with backhaul connections for supporting the small cell base transceiver stations.

The network evaluation function, denoted by $f2$, can be represented by:

$$f2(X)=T_X/(C_M*C_B+D_0)+D,$$

wherein the parameter X represents the set of small cell base transceiver stations being evaluated, the parameter $T_X$ represents the number of transactions captured by the set of small cell base transceiver stations X per unit time, the parameter $C_M$ represents the general cost associated with M microwave links that interconnect the small cell base transceiver stations X, the parameter $C_B$ represents the operating cost of B backhaul connections for supporting the small cell base transceiver stations X, and the parameters $D_0$, D represent additional case specific factors.

The method can include receiving information about coordinates of lattice points in the first overall region, wherein determining within the first overall region the first location that is associated with the higher score relative to neighboring locations comprises determining among the lattice points within the first overall region a first lattice point that is associated with a higher score relative to neighboring lattice points, in which the score is calculated according to the first function that takes into account an estimated number of people in the first coverage region that is expected to have wireless cellular service coverage provided by the first small cell base transceiver station if the first small cell base transceiver station is established and operated at the first lattice point.

At least some of the lattice points can include points on a regular grid.

At least some first lattice points can have a first lattice density, and at least some second lattice points can have a second lattice density that is different from the first lattice density.

A more sparsely populated lattice is used for a flatter terrain where microwave signals propagate a farther distance, and a more densely populated lattice is used for a steeper terrain where microwave signals propagate a shorter distance.

Unless otherwise defined, all technical and scientific terms used herein have the same meaning as commonly understood by one of ordinary skill in the art to which this invention belongs. In case of conflict with patent applications or patents incorporated herein by reference, the present specification, including definitions, will control.

The details of one or more implementations of systems and methods for establishing small cell telecommunications networks are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

The disclosure generally relates to a system and method for determining optimized (or near optimized) sites or locations for building base transceiver stations that provide wireless network services. The system and method can help a wireless network provider achieve effective design and implementation of telecommunications infrastructure that includes small cell base transceiver stations (BTS). For example, a small cell base transceiver station can have low energy consumption that results in low transmission power. For example, a small cell base transceiver station can be powered (or partially powered) by solar and/or wind energy. The network topology (e.g., placement of the many small cell base transceiver stations) can affect the operational cost and the access to subscribers. Placing the base transceiver stations at optimal locations can reduce the operational costs and/or increase access to subscribers. When the base transceiver stations are placed at non-optimal locations, the network node counts and the number of expected microwave hops can increase, thereby increase operational costs, and may also have a negative impact on user experience. Using small cell base transceiver stations provides a greater precision in covering target populations. This can be an important consideration when working with solar powered sites.

In this document, the term "small cell base transceiver station" refers to any low energy base transceiver station that is used to provide coverage for a region having a dimension up to several thousand meters. The term "wireless network service" can refer to any type of service (e.g., mobile phone service) that enables user devices (e.g., mobile phones) to connect to a network wirelessly.

Figure 1:
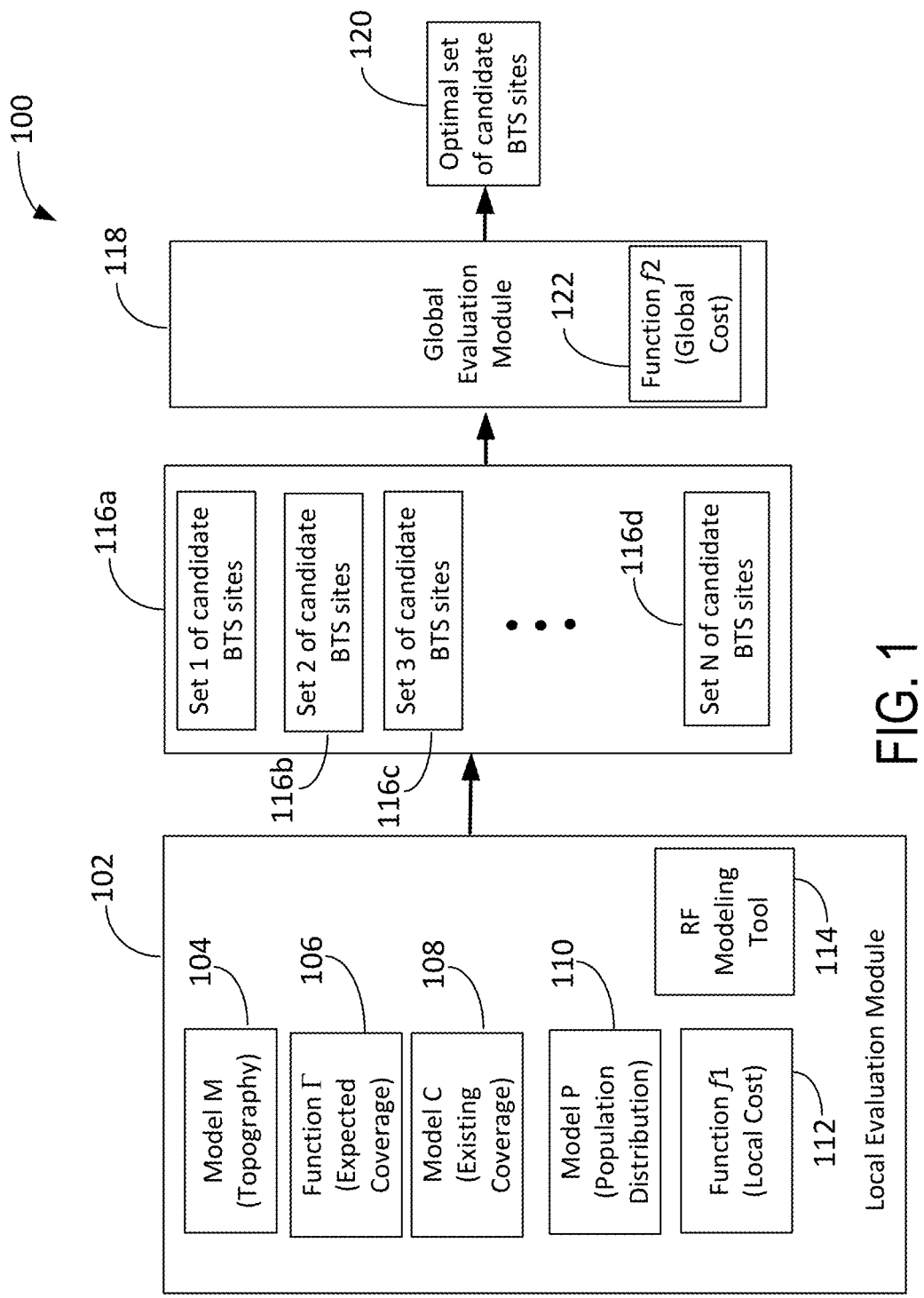
FIG. 1 is a diagram of an exemplary system for designing small cell telecommunications networks.

Referring to FIG. 1, in some implementations, a system 100 for designing small cell telecommunications network includes a local evaluation module 102 that receives information that can be used to evaluate the feasibility of setting up a base transceiver station at a given site. Assume that the system 100 is used to optimize coverage for a target region T The target region T can be, e.g. a region that covers a small town spanning less than a kilometer, or a region of a country spanning several states or provinces, and extending hundreds of kilometers.

The system 100 can be implemented using, e.g., a computer having one or more data processors that execute instructions for implementing the processes described in this document.

The local evaluation module 102 applies an expected coverage function $\Gamma$ 106 and an evaluation function $f1$ 112 to information derived from a topography model M 104, an existing coverage model Cov 108, and a population model P 110 in order to evaluate the candidate locations for building the base transceiver stations. For example, the expected coverage function $\Gamma$ 106, the evaluation function $f$ 112, the topography model M 104, the existing coverage model Cov 108, and the population model P 110 can be set up when the system 100 is initialized. For example, the model M 104, the model Cov 108, and the model P 100 can be stored locally in a local storage, such as a local hard drive accessible to the one or more data processors. For example, the model M 104, the model Cov 108, and the model P 100 can be stored in a cloud server.

The model M 104 describes the geographic topography underlying T. The model M 104 can be established using, e.g., data obtained from open source geographic information system (GIS) databases. For example, the model M 104 includes information about the locations of hills and mountains, which may block or reduce the signal strengths of wireless signals. A first base transceiver station located at a region that has wide, plain fields may provide wireless coverage to a larger region, and a second base transceiver station located at a mountainous terrain may provide wireless coverage to a smaller region, even when the first and second base transceiver stations have the same transmit signal power.

The model M 104 is provided to an RF modeling tool 114 in order to determine the wireless coverage of a base transceiver station at a given location. The RF modeling tool 114 is based on a model that takes into account the most current understanding of RF propagation and loss, and can determine the wireless coverage provided by existing base transceiver stations. During the process of identifying candidate locations for building base transceiver stations, the RF modeling tool 114 can also determine the wireless coverage provided by hypothetical base transceiver stations if the hypothetical base transceiver stations are built at the identified candidate locations, and this in turn can be used to determine the regions that remains without wireless coverage.

The model Coy 108 describes existing telecommunications coverage in and around T The model Cov 108 can be established using, e.g., the RF modeling tool 114 taking into account of assumptions about third-party tower locations and transmission standards used by the third-party base transceiver stations, and the model M. For example, the RF modeling tool 114 determines how far the wireless signals transmitted by the third-party base transceiver station can propagate, taking into account geographic topography information provided by the model M, and can estimate the wireless coverage of the third-party base transceiver stations. Having estimated information about the regions that have wireless coverage provided by third-party base transceiver stations, one can estimate the regions that do not have wireless coverage. For example, a wireless network provider can use the model Cov 108 to establish new base transceiver stations at regions where there is no wireless coverage by other wireless network providers.

The model P 110 describes a population (potential users) distribution associated with T. For example, the model P 110 can be established using census data or market research data. For example, the model P 110 can take into account the age, education level, and income level of the population to estimate the distribution of potential users of wireless network services.

The expected coverage function $\Gamma: T \to R$ 106 is used to model the expected coverage of a point x in the region T, given the model M 104 and an understanding of radio frequency (RF) propagation and loss sufficient to model hypothetical coverage (e.g., radiation intensity, link budget) should a base transceiver station be placed at x. The function $\Gamma$ 106 can be instantiated by a system of partial differential equations.

The evaluation function $f1: T \to R$ 112 associates to the point x in Tan evaluation score related to operating a hypothetical site at x. The evaluation score can depend on many factors, such as the cost of operating the base transceiver station, the amount of wireless coverage provided by the base transceiver station, the number of people that will potentially use the wireless network service provided by the base transceiver station, the number of wireless devices that will potentially use the wireless network service provided by the base transceiver station, and/or the amount on revenue that may be generated as a result of establishing the base transceiver station.

The local evaluation module 102 determines a plurality of sets (e.g., N sets) of candidate BTS sites (e.g., 116a, 116b, 116c, 116d, etc.), in which each set of candidate BTS sites can be determined using, e.g., a process that evaluates candidate sites locally. For example, a gradient descent method can be used to find locally optimized candidate sites in which the selected candidate site has a higher score than neighboring sites. For example, the score can be determined using the evaluation function $f1$ 112. The evaluation function $f1$ 112 can be based on factors related to site operational cost and the parameters of the base transceiver station, such as the antenna height, antenna pattern, antenna gain, frequency, transmit power, azimuth angle of the antenna, and the mechanical downtilt angle of the antenna. The evaluation function $f1$ 112 can also be based on the parameters C and P, in which the parameter C represents the operational cost of the small cell base transceiver station, and the parameter P represents a population in the wireless signal coverage region of the small cell base transceiver station.

For example, the evaluation function $f1$ 112 may not be differentiable due to the discrete nature of the topographical model M. Thus, in some implementations, a discrete gradient descent method is used, which does not use the derivative of function $f1$ 112 in finding the local maxima (or minima), but rather evaluate values of function $f1$ 112 at discrete grid points. Because the grid points are not continuous, the "local optimal BTS site" that is determined using the discrete gradient descent process refers to the grid point that has a higher score compared to the scores of neighboring grid points. If the lattice of grid points changes, such as using more closely spaced grid points, the local optimal BTS site may also change slightly.

A global evaluation module 118 evaluates the N sets of candidate BTS sites using a global evaluation function $f2$ 122 to determine an optimal set of candidate BTS sites 120. The network service provider can then set up base transceiver stations based on the optimal set of candidate BTS sites 120. The term "optimal set of candidate BTS sites" refers to the most optimal set of candidate BTS sites among the N sets of candidate BTS sites determined by the local evaluation module 102. Because it is difficult to exhaustively evaluate every possible combination of candidate BTS sites, the optimal set of candidate BTS sites 120 determined by the global evaluation module 118 may not be the absolute optimal set of candidate BTS sites. There is a possibility that another set of candidate BTS sites that was not identified by the local evaluation module 102 may have a higher score than the optimal set of candidate BTS sites 120 determined by the global evaluation module 118.

Figure 2:
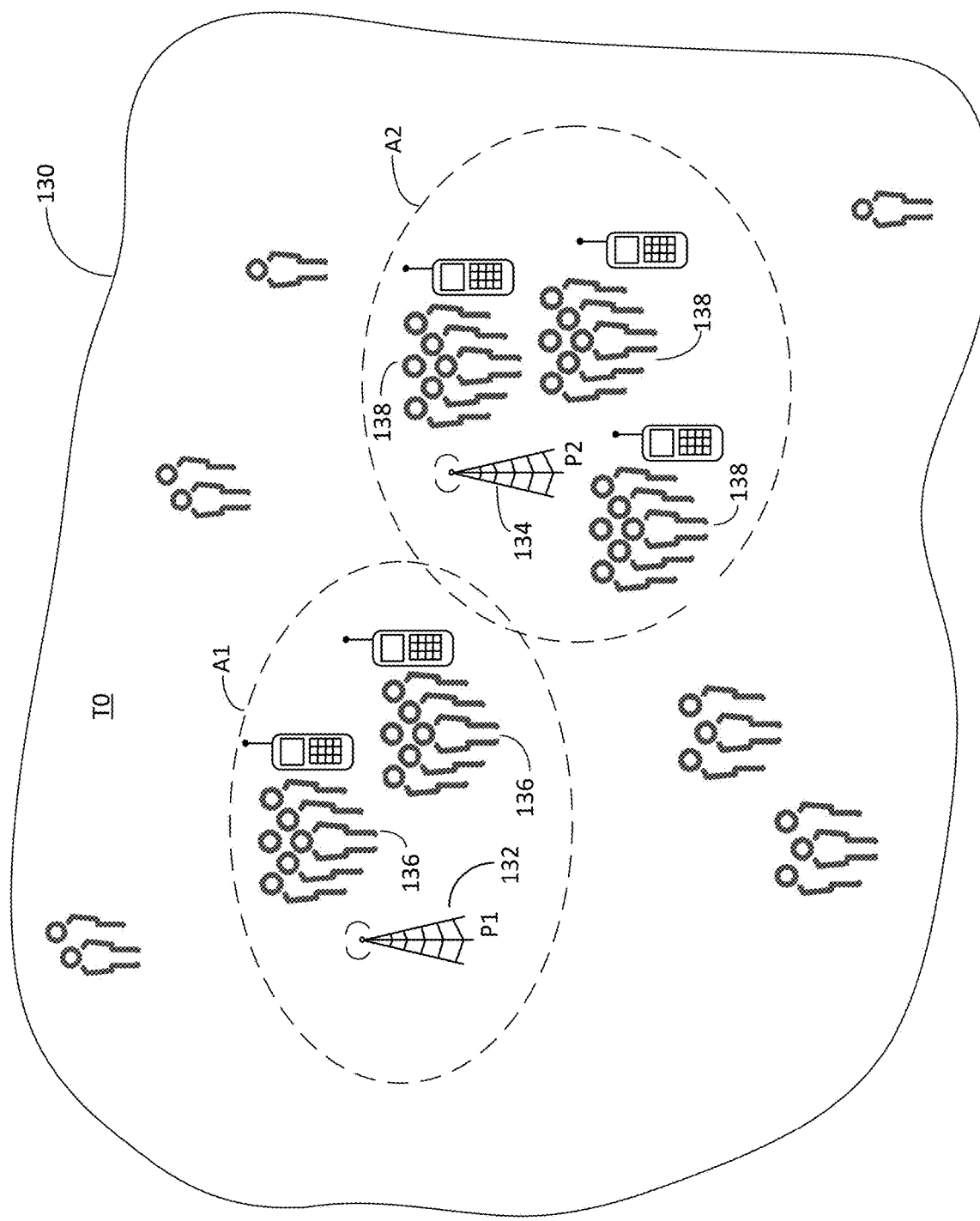
FIGS. 2 to 5 are diagrams illustrating the use of a gradient descent process to determine candidate sites for building base transceiver stations.

Referring to FIG. 2, the following describes an example of using the system 100 to determine candidate sites for building base transceiver stations in a geographical region 130 that has two existing base transceiver stations 132 and 134 located at P1 and P2, respectively. The base transceiver station 132 provides wireless network services to a first population 136 and the base transceiver station 134 provides wireless network services to a second population 138. The population 136 represents a group of users operating wireless devices within the coverage area of the base transceiver station 132, and the population 138 represents a group of users operating wireless devices within the coverage area of the base transceiver station 134.

For example, the model C 108 is used to determine the existing coverage A1 and A2. The region A1 represents the wireless coverage provided by the base transceiver station 132, and the region A2 represents the wireless coverage provided by the base transceiver station 134. Initially, the region T0 represents the area within region 130 that does not have wireless coverage. The region T0 is equal to the region 130 minus the region A1 and minus the region A2.

Figure 3:
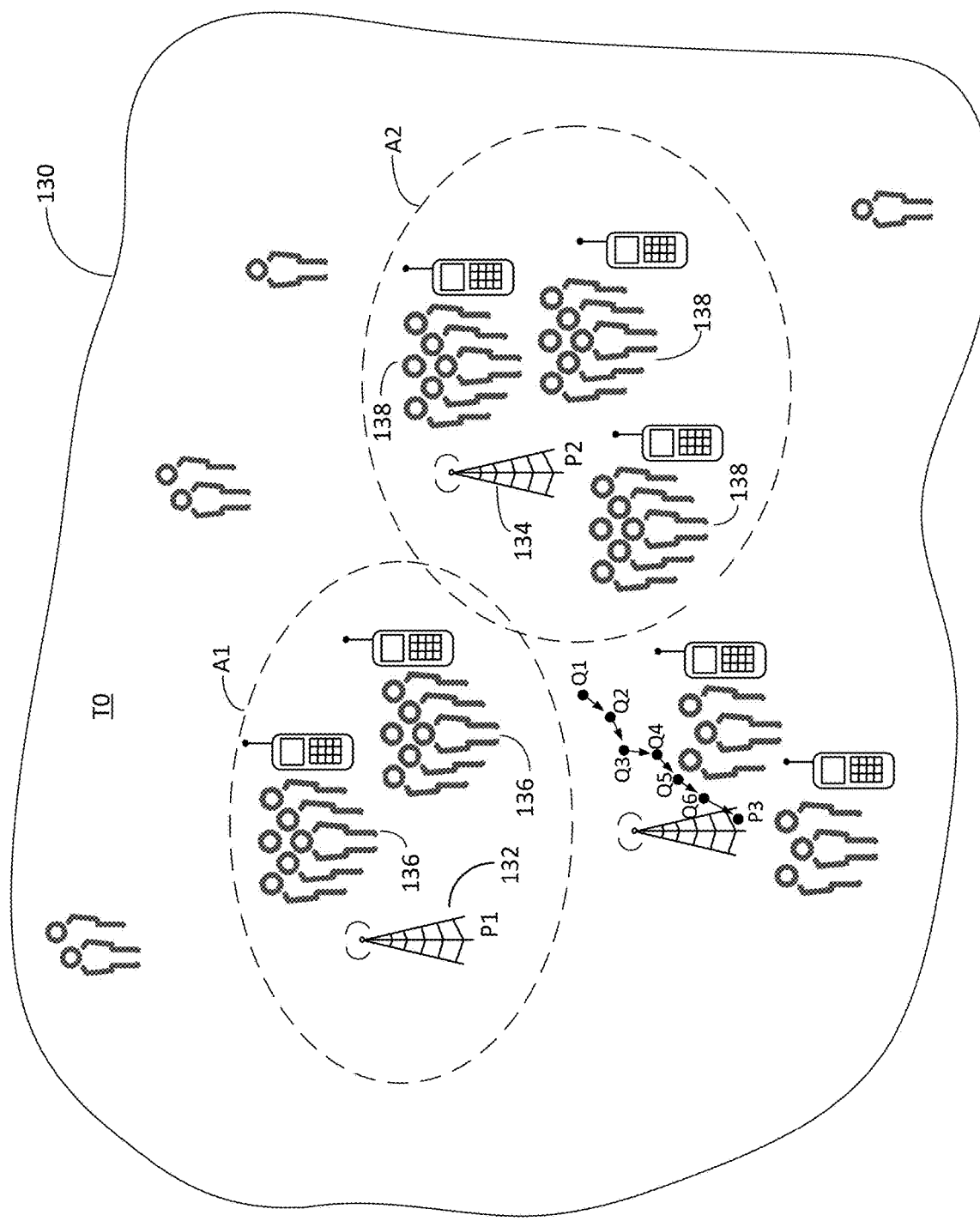

The system 100 determines where the base transceiver stations should be placed in the region T0. The following describes an example for determining one set of candidate sites. Referring to FIG. 3, for example, an initial location Q1 is selected. The system 100 applies the gradient descent method to compare the score at Q1 with the scores of neighboring locations, and determines that Q2 has a higher score than Q1. For example, the scores are determined using the function $f1$ 112. The system 100 compares the score at Q2 with the scores of neighboring locations, and determines that Q3 has a higher score. The same process is used to identify points Q4, Q5, and Q6, each having a higher score than the previous point, until P3 is identified, in which the score at P3 is higher than the scores at neighboring locations. The system 100 determines that P3 is a local optimal candidate site.

Figure 4:
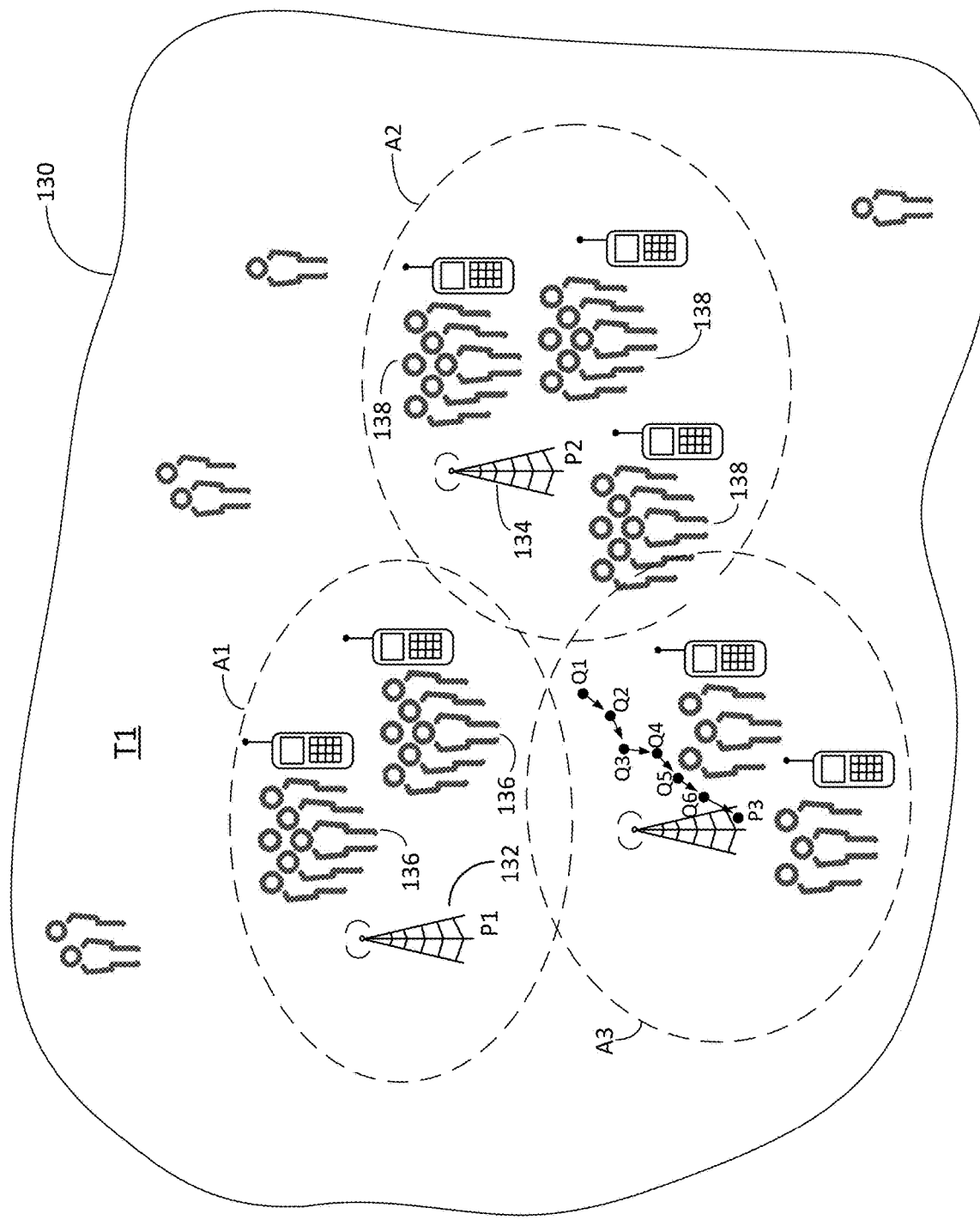

Referring to FIG. 4, the function $\Gamma$ 106 is used to determine the expected coverage A3 of the point P3 given M and an understanding of the RF propagation and loss sufficient to model hypothetical coverage should a base transceiver station be placed at P3. The system 100 determines the region T1 without wireless coverage by subtracting the region A3 from the region T0, i.e., T1=T0−A3.

Figure 5:
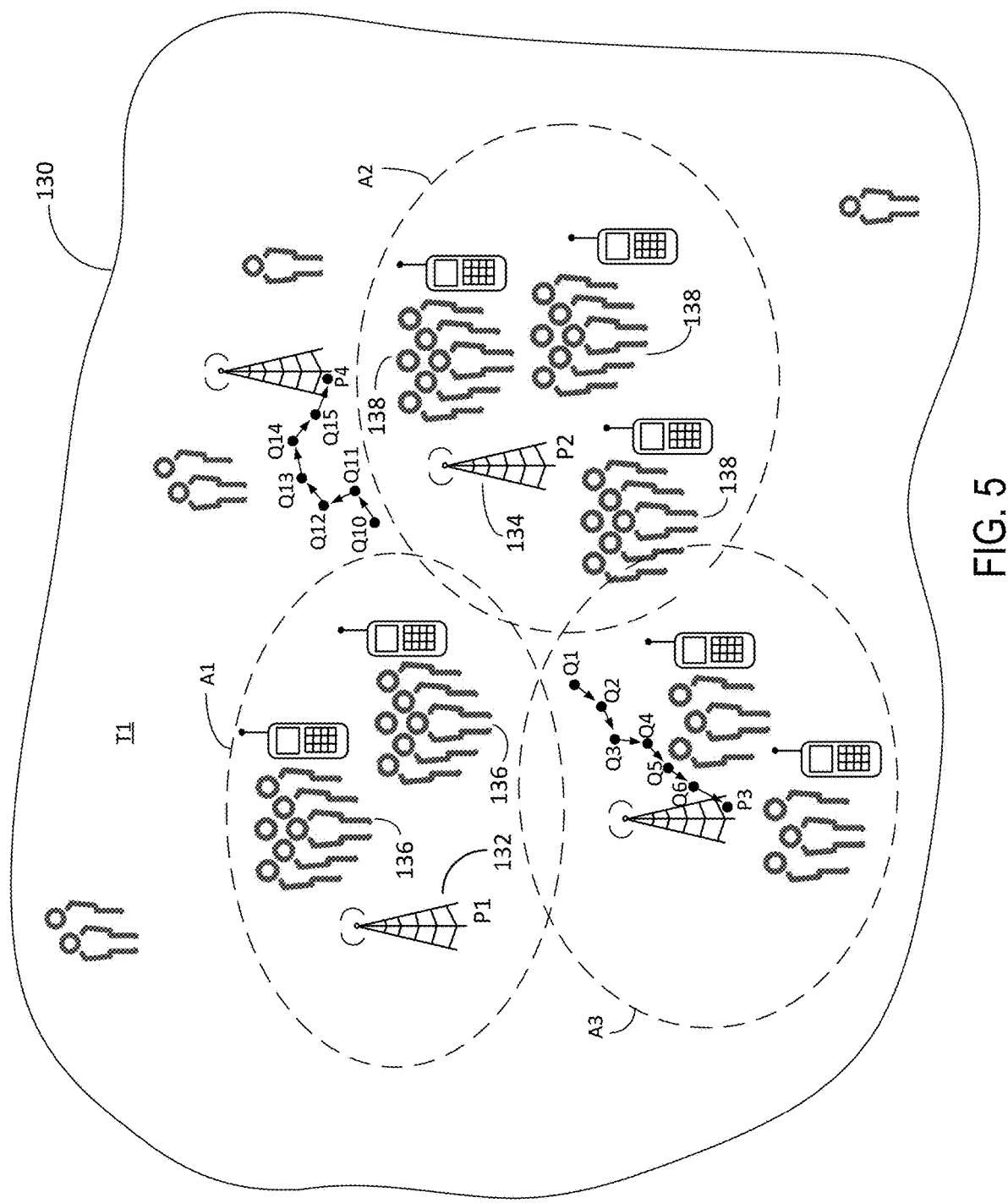

Referring to FIG. 5, the system 100 next determines where another base transceiver stations should be placed in the region T1. For example, an initial location Q10 is selected. The system 100 applies the gradient descent method to compare the score at Q10 with the scores of neighboring locations, and determines that Q11 has a higher score than Q10. For example, the scores are determined using the function $f1$ 112. The system 100 compares the score at Q11 with the scores of neighboring locations, and determines that Q12 has a higher score. The same process is used to identify points Q13, Q14, and Q15, each having a higher score than the previous point, until P4 is identified, in which the score at P4 is higher than the scores at neighboring locations. The system 100 determines that P4 is a local optimal candidate site.

The system 100 applies the function $\Gamma$ 106 to determine the expected coverage A4 of the point P4 given M and an understanding of the RF propagation and loss sufficient to model hypothetical coverage should a base transceiver station be placed at P4. The system 100 determines the region T2 without wireless coverage by subtracting the region A4 from the region T1, i.e., T2=T1−A4. After determining the candidate BTS sites P3 and P4, the system 100 uses the same process to determine additional candidate BTS sites P5, P6, etc., until the desired coverage level in region 130 is achieved. The candidate BTS sites P3, P4, P5, P6, etc., are collectively designated as set S1 of candidate BTS sites.

For example, setting up base transceiver stations at locations P3, P4, P5, P6, etc., will likely provide better results by increasing the number of users that are serviced by the base transceiver stations with relatively lower costs, as compared to other methods, such as determining the base transceiver station locations using human intuition.

In some implementations, in determining the candidate BTS sites, the same evaluation function can be used in the gradient descent process to determine the scores at various locations, such that the evaluation function used to find candidate BTS site P3 is the same as the evaluation function used to find candidate BTS site P4, and so forth.

In some implementations, different evaluation functions can be used in different iterations of the gradient descent process. One iteration of the gradient descent process refers to the process of using gradient descent to find a local optimal candidate BTS site. For example, a region without wireless coverage can span multiple states or countries. A wireless network service provider that intends to set up base transceiver stations in the region may have to deal with different laws and cost structures, so different evaluation functions are used to determine the local optimal candidate BTS sites for different states or countries. For example, the evaluation function $f1$ can include several sub-rules, such as $f11$, $f12$, $f13$, etc., and the different sub-rules are used to determine the local optimal candidate BTS sites for different states or countries.

After determining the set S1 of candidate BTS sites, the system 100 uses the same process to determine additional sets S2, S3, S4, etc., of candidate BTS sites, in which different initial locations are used for the different sets. The global evaluation module 118 evaluates the sets S1, S2, S3, S4, etc., of candidate BTS sites and identify the global optimal set of candidate BTS sites.

The following describes a process for determining candidate BTS locations that includes two iterative processes, in which a first iterative process determines multiple sets of candidate locations for setting up new base transceiver stations, and the second iterative process evaluates and compares the multiple sets of candidate BTS locations to determine the best set of candidate BTS locations.

In the first iterative process, an evaluation function $f1$ is set up, an initial location is chosen from the region that does not have wireless service, and the gradient descent method is used to find a local optimal location for setting up the first base transceiver station. The coverage area of the first base transceiver station is determined, taking into account of the topography of the land, and that area is removed from the region that does not have wireless service (because that area will be serviced by the first base transceiver station). An initial location is chosen from the region that does not have wireless service, and the gradient descent method is used to find a local optimal location for setting up the second base transceiver station. The coverage area of the second base transceiver station is determined, and that area is removed from the region that does not have wireless service (because that area will be serviced by the second base transceiver station). The first iterative process continues until some criterion is met, such as a target percentage of the population will have wireless service, or the locations for a target number of base transceiver station have been selected.

The first iterative process finds local optimal sites for the BTS locations, which may not be the global optimal sites. In the first iterative process, different initial locations can lead to different local optimal sites. The first iterative process is applied multiple times to find multiple sets of candidate BTS sites. Different initial locations are chosen for applying the first iterative process to find different sets of candidate BTS sites, for performing the first iterative processes so that multiple sets of candidate locations are identified. Then the various sets of candidate locations are evaluated and compared against one another to identify a global optimal set of candidate locations.

A small cell base transceiver station enables user equipment (e.g., mobile phones) to communicate with a wireless network to, e.g., make calls or access the Internet. A small cell base transceiver station can include one or more of the following components: antennas, a power source (e.g., a solar power source), one or more transceivers, a power amplifier, a combiner, a multiplexer, and a control module. For example, the transceiver provides transmission and reception of signals, communicates with the user equipment, and communicates with a base station controller. The power amplifier amplifies the signal from the transceiver for transmission through the antenna. The combiner combines feeds from several transceivers so that they can be sent out through a single antenna in order to reduce the number of antenna used. The multiplexer allows for separation of transmit and receive signals. The control module controls and manages the various units of the base transceiver station, including any software. Configurations, status changes, and software upgrades can be performed through the control module.

Quantitative measures for small cell network design are provided to mitigate cost while maximizing accessible coverage. The following describes in more detail an algorithmic strategy for growing optimized networks that can reduce costs and increase accessible coverage.

Gradient Descent (GD) Setup

In some implementations, a strategy for small cell network design is to apply gradient descent to a cost function appropriate for the measure of network design quality and accounting for operational cost, user experience, and penetration (e.g., population coverage and access to connectivity). To optimize coverage for a target region T, the system 100 first sets up the following:

1. A topography model M 104 describes the topography underlying T.
2. An expected coverage function $\Gamma: T \to \mathbb{R}$ 106 modeling the expected coverage of a point x in T given M and an understanding of radio frequency (RF) propagation and loss sufficient to model hypothetical coverage (e.g., radiation intensity, link budget) should a base transceiver station be placed at x. $\mathbb{R}$ is the set of real numbers. The function $\Gamma$ allows the system 100 to determine or estimate the regions that will receive wireless network coverage provided by a base transceiver station that is set up at location x.
3. An existing coverage model Coy 108 of existing telecommunications coverage in and around T
4. A population model P 110 describing a population (potential users) distribution associated with T.
5. An evaluation function $f1: T \to \mathbb{R}$ 112 that associates the point x in T with an evaluation score.

In an example application, the topography model M 104 includes an open source geographic information system (GIS) database, the existing coverage model Coy 108 is a model taking into account the most current understanding of RF propagation and loss together with the model M 104 and assumptions about transmission standards and third-party tower locations. For example, the GIS database can provide input data for the radio frequency modeling tool 114 that can inform the algorithm about existing coverage. Any input data that provide a model of existing coverage can be used.

The expected coverage function $\Gamma: T \to \mathbb{R}$ 106 determines the expected wireless coverage provided by a base transceiver station at a location x based on the current physical understanding of radio frequency propagation and loss, and is in general instantiated by a system of partial differential equations representing electromagnetic waves transmitted by the base transceiver station. An existing model of coverage informed by geographical data can be used to instantiate the gradient descent.

The function $f1$ 112 is used to generate scores for various locations x, and the various locations x can be evaluated by comparing the scores. For example, if a location x1 has a higher score than a location x2, this indicates that the location x1 is more suitable than the location x2 for building a base transceiver station according to the criteria specified in the evaluation function $f1$ 112. For example, the evaluation function $f1$ 112 can be used to compare several locations and determine which location among the several locations is a local optimal candidate site that has a higher score than neighboring locations, and therefore more suitable than neighboring locations for setting up a base transceiver station.

The evaluation function $f1$ 112 can be implemented in many ways, depending on the factors that are important to the network design engineer who uses the system 100 to determine the candidate sites for the base transceiver stations of a wireless network. For example, the evaluation function $f1$ 112 can be based on factors related to site operational cost. For example, the evaluation function $f1$ 112 can take into account the wireless coverage provided by the base transceiver station. The wireless coverage provided by the base transceiver station can depend on one or more parameters of the base transceiver station, such as:

Base station antenna height (meter)
Antenna pattern
Frequency (e.g., 20 MHz to 20 GHz)
Transmit power (dBm)
Antenna gain (dBi)
Azimuth (degrees)
Mechanical downtilt (degrees)

The evaluation function $f1$ 112 calls the expected coverage function $\Gamma$ 106 and passes the parameters of the base transceiver station to the function $\Gamma$ 106 in order to determine the expected wireless coverage provided by the base transceiver station. For example, the evaluation function ƒ1 112 can be based on both C and P, in which the parameter C represents the operational cost of the small cell base transceiver station, and the parameter P represents a population in the wireless signal coverage region of the small cell base transceiver station. For example, the evaluation function in item 5 above may not be differentiable due to the discrete nature of the topographical model M 104. Thus, in some implementations, a discrete gradient descent method is used.

Iteration for Network Design Optimization

After the models M, C, P, and functions $\Gamma: T \to \mathbb{R}$ and ƒ1: $T \to \mathbb{R}$ have been set up as described above, an iterative gradient descent is performed on random initial states to grow optimal network candidates. A general strategy is to locate a sequence of points $x_i$ which together represent the locations of sites in a candidate base transceiver station network. The first step is to choose an initial point $x_0$, within some appropriate interior of T, and then to locate a "best neighbor" of $x_0$ among neighboring points $x_0^i$, $1 < i < p$ chosen by any number of algorithms appropriate to the use case. An example of the "best neighbor" algorithm is shown below.

---

Best Neighbor $x_0^{max} = x_0$
while i <= p do
   if $f(x_0^i) > f(x_0^{max})$ then
     $x_0^{max} = x_0^i$
   end if
   i = i + 1
end while
return $x_0^{max}$

---

Figure 6:
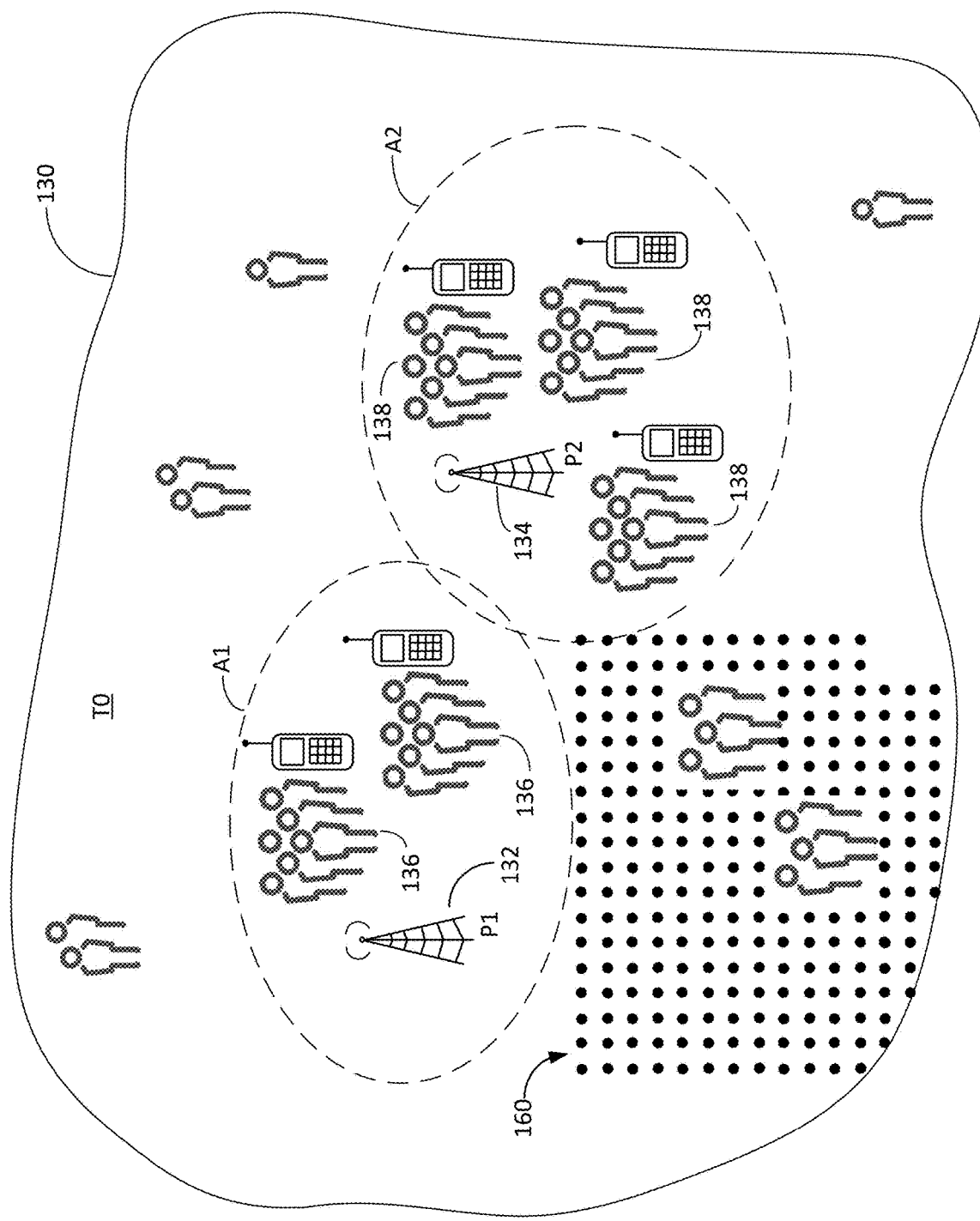
FIGS. 6 and 7 are diagrams that show lattices of grid points for evaluating candidate sites for base transceiver stations.

For example, a lattice of candidate test points is identified. For example, referring to FIG. 6, regularly spaced grid points 160 can be set up in the region T. The figure only shows grid points for a portion of the region T. It is understood that the grid points will extend throughout the region T.

Figure 7:
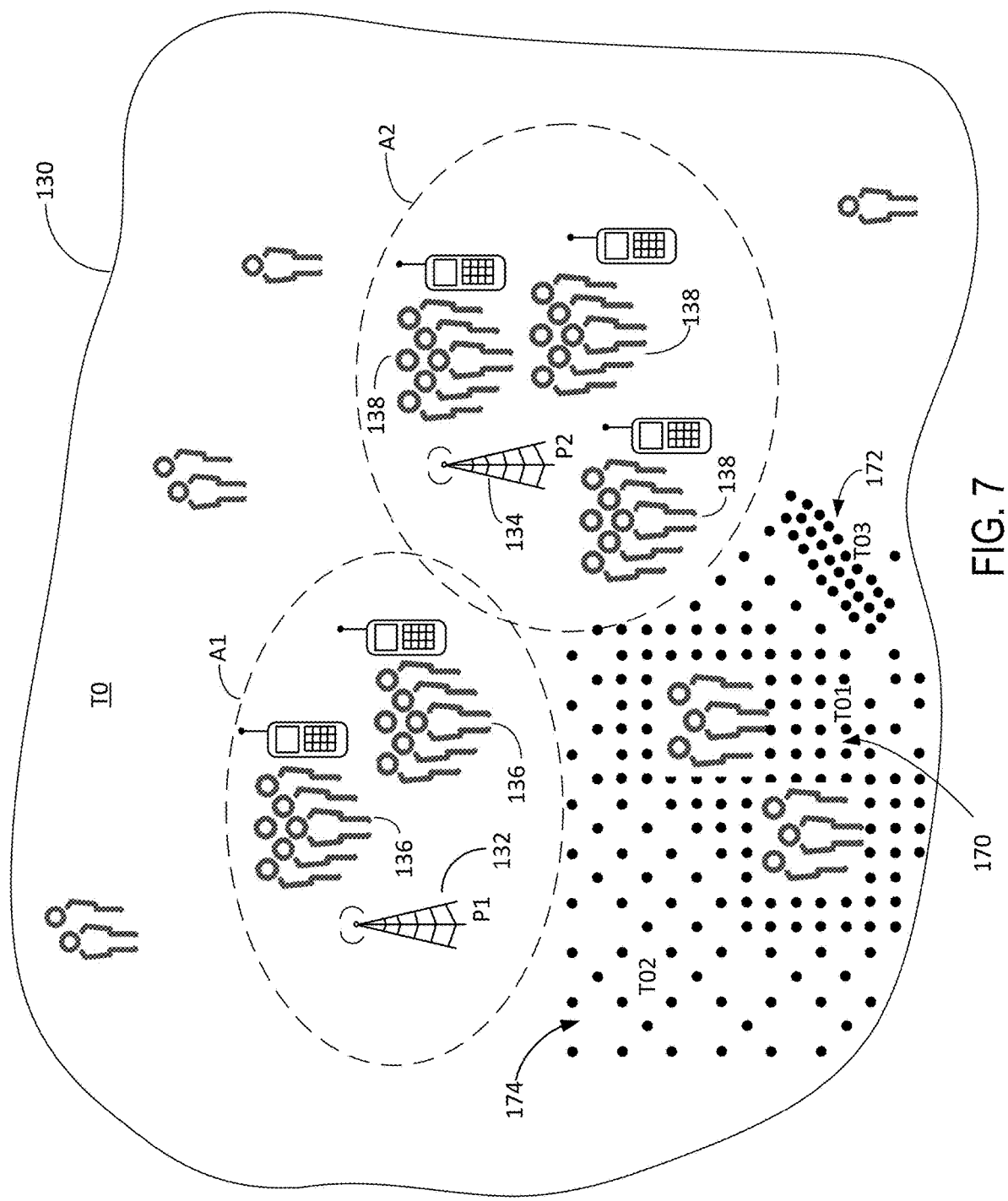

Referring to FIG. 7, the lattice of candidate test points need not be a regular grid. For example, the grip points can have different spacing to take into account of variations in the topography. In the example of FIG. 7, a region T01 has a denser population that a region T02, so a group of grid points 170 at the region T01 is spaced apart at shorter distances as compared to a group of grid points 174 at the region T02. A region T03 has mountains and the elevation changes rapidly, so a group of densely spaced grid points 172 is used. For example, both the distribution of points and various features of the lattice (e.g. lattice density, geometry) are typically parametrized and are flexible per use case. For example, a more sparsely populated lattice may be appropriate in a flat terrain where signal propagation is maximal, and in general handoff considerations may require that a more densely populated lattice be chosen. In some implementations, every iteration of gradient descent requires both a lattice description and an evaluation function.

Figure 8C:
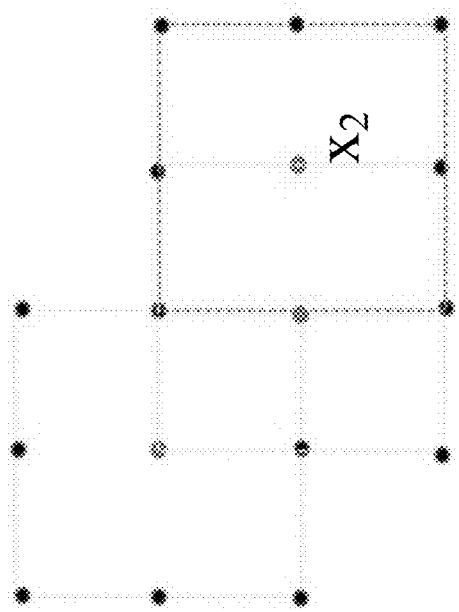
FIGS. 8A to 8C shows an example of the discrete gradient descent process.
Figure 8B:
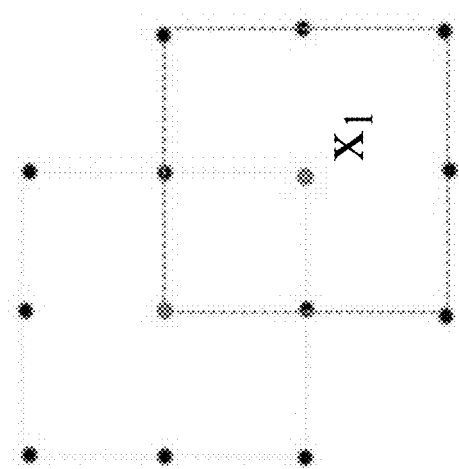
Figure 8A:
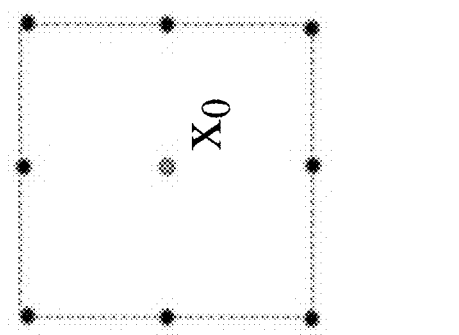

FIGS. 8A to 8C shows an example of the discrete gradient descent process. The system 100 select the 8 points surrounding $x_0$, i.e., the corners and edge centers of a square centered at $x_0$, as the neighboring points. For example, the choice of the initial point $x_0$ should not be completely random but may be chosen from within assumed "good points," e.g. from within an area known to be populated, or along a known road connecting population centers. The evaluation function ƒ1 112 is then used to compare these points $x_0^i$ and the highest scoring is selected to be the center point for the next iteration.

FIG. 8B shows that among the eight points that are neighbors of $x_0$, a point $x_1$ has a higher score than the point $x_0$. FIG. 8C shows that among the eight points that are neighbors of $x_1$, a point $x_2$ has a higher score than the point $x_0$. This process continues until a point $x_j$, maximizing an ƒ1 score among its neighbors, is located. The point $x_j$ is considered to be best among those points tested within the region immediately surrounding $x_j$ and is added to a list N. The process is then repeated, this time on the set $T=T\backslash\Gamma(x_j)$: the original region T where the points sufficiently covered by the optimal point $x_1$ according to the coverage model $\Gamma$ have been removed to reduce redundancy in the final selection. The resulting "best point" is again added to the list N, and so forth. Thus a candidate network N is grown by one for each iteration on the increasingly restricted target region T.

This process continues until the region T is sufficiently covered; i.e. until some pre-specified tolerance parameter is achieved. For example, the system 100 may continue to iterate until the total percentage of P covered by the vector of candidate points N according to F reaches, e.g. 90%.

In general many candidate networks (perhaps thousands depending on the size of T) can be determined, from which set of networks the overall best aggregate performer (measured by some application of ƒ1) is selected. The reason for multiple iterations is that the gradient descent process can find the local optimal candidates, and the overall best aggregate performer corresponds to the global optimal candidates.

When using the evaluation function ƒ1 112 to determine the score for a location x, if the function ƒ1 112 takes into account of the parameters of the base transceiver station, then the parameters are also varied in order to determine the optimal settings for the parameters. For example, the optimal downtilt angle of a base transceiver station at location x1 may be different from the optimal downtilt angle of a base transceiver station at location x2.

Examples

Examples of the gradient descent technique and a few exemplary model types are described below. The following describes a process for locally evaluating the merits of given sites.

Local Evaluation

Assume, for a site at x covering region S, the following conditions (referred to as A0) hold:
P: population covered by S
C: operational cost of keeping S live
M: mobile penetration (cell phones/person)
D: any other case specific factor In general, each scenario has its own set of special parameters. Whether handoff is relevant or not will affect the function for evaluating the site x.

If handoff is irrelevant, and assuming the A0 conditions, then an example of the evaluation function $f_0(x)$ can be written as follows:

$$f_0(x) = P*M/C + D$$

If handoff is relevant, in order for successful handoff from site A to site B to occur, the zones of coverage determined by A and B need to sufficiently overlap. Thus for a collection of sites $S=\{S_i\}$, we may define a symmetric function $$c: S \times S \to [0,1]$$

that returns the handoff success likelihood between sites x and y, e.g. $c(x, y)=1$ if handoff can be guaranteed, and c(x, y)=0.5 if handoff attempts between x and y succeed 50% of the time. For example, a discrete handoff success rate model would return 1 if coverage regions intersect, and 0 otherwise. For example, pairs of sites within a network corridor designed to facilitate handoff can have a success rate greater than 0.95.

In examples in which it is important that handoff be successful, the following setup can be used. For a target region T let c: T×T→[0, 1] denote the handoff success likelihood for pairs of points in T. That is, for points x, y in T let c(x, y) denote the likelihood of handoff success between x and y given the propagation model Γ described above. For base transceiver stations Sx, Sy located at points x, y and exhibiting some prescribed anatomy and parameters (e.g., height, sectorization, transmission power, etc.) let c(x, y) be the handover likelihood between Sx and Sy.

For example, assume that we wish to design a network for which pairwise handoff success is required to be at least k, i.e. we require that c(x, y)≥k for any points x and y selected as candidate sites. Define a further selection function based on this criterion by $$s(x,y)=\text{Bool}(c(x,y) \geq k)$$

i.e., s(x, y) is 1 if handoff success likelihood between x and y meets the requirement c(x,y)≥k and 0 otherwise. Define a new evaluation function $f3$ by the formula $$f3(x_n) = f_0(x_0) * \left(\sum_{i<n} s(x_n, x_i)\right)$$

where by convention we define $\beta(x_0)=f_0(x_0)$ for an independent site-specific network topology agnostic evaluation function $f_0$. The summation above will be non-zero only in case $s(x_n, x_1)$ is non-zero for some i, and will be larger for a greater simultaneous overlap (allowing in this case for weighting on behalf of "soft handoff"). In other words, the evaluation of a new point $x_n$ given that points $x_i$, i<n, have already been selected, leads to selection of $x_n$ only if the handoff success likelihood $c(x_n, x_j)$ is at least k for some $x_j$ already selected. In this way we may ensure that the resulting network exhibits the required pairwise handoff success rate.

For example, more generally, if the required success rate is stipulated to be within a range $[k_0, k_1]=[0, 1]$, then one may modify the above treatment by defining $$s(x,y)=\text{Bool}(c(x,y) \in [k_0,k_1])$$

ensuring that a candidate is selected only if its rate of handoff success with some other site already selected is within the specified range.

The above evaluation functions are provided as examples, but other evaluation functions can also be used. The other functions may take into consideration, e.g., a preference for proximity to already existing coverage and temporal traffic projections implied by, e.g. seasonal effects and tourism.

Global Candidate Evaluation

In addition to the local metrics that are useful in selecting sites for inclusion in a candidate network, other global metrics may be used to evaluate and compare completed networks.

Suppose that for a region T a procedure of the type described above has been applied to generate a selection of candidate model networks N. Assume for a given network Nin N the following:

(a) p(N), the expected revenue generated per unit time (b) c(N), cost of operating N per unit time.

For example, p can be a function of the population covered by N, the mobile penetration rates for the region covered by N, pricing structures in the region, and other factors. The function c can be dependent on various factors contributing to operational cost (e.g., backhaul, microwave links, energy, etc.) as well as flat costs per site in N. These costs can be, e.g., location specific. The comparative evaluation of the optimal network in N allows us to define the network N, defined by having $$F(\overline{N})=\max\{F(N) \text{ for } N \in \mathcal{N}\}$$

where $$F(N)=p(N)-c(N),$$

as the optimal choice among those selected by an iteration of our gradient descent application. In this example, the optimal network is the one that has the highest expected revenue generated per unit time minus the cost of operating N per unit time. Other evaluation functions can also be used.

Figure 9:
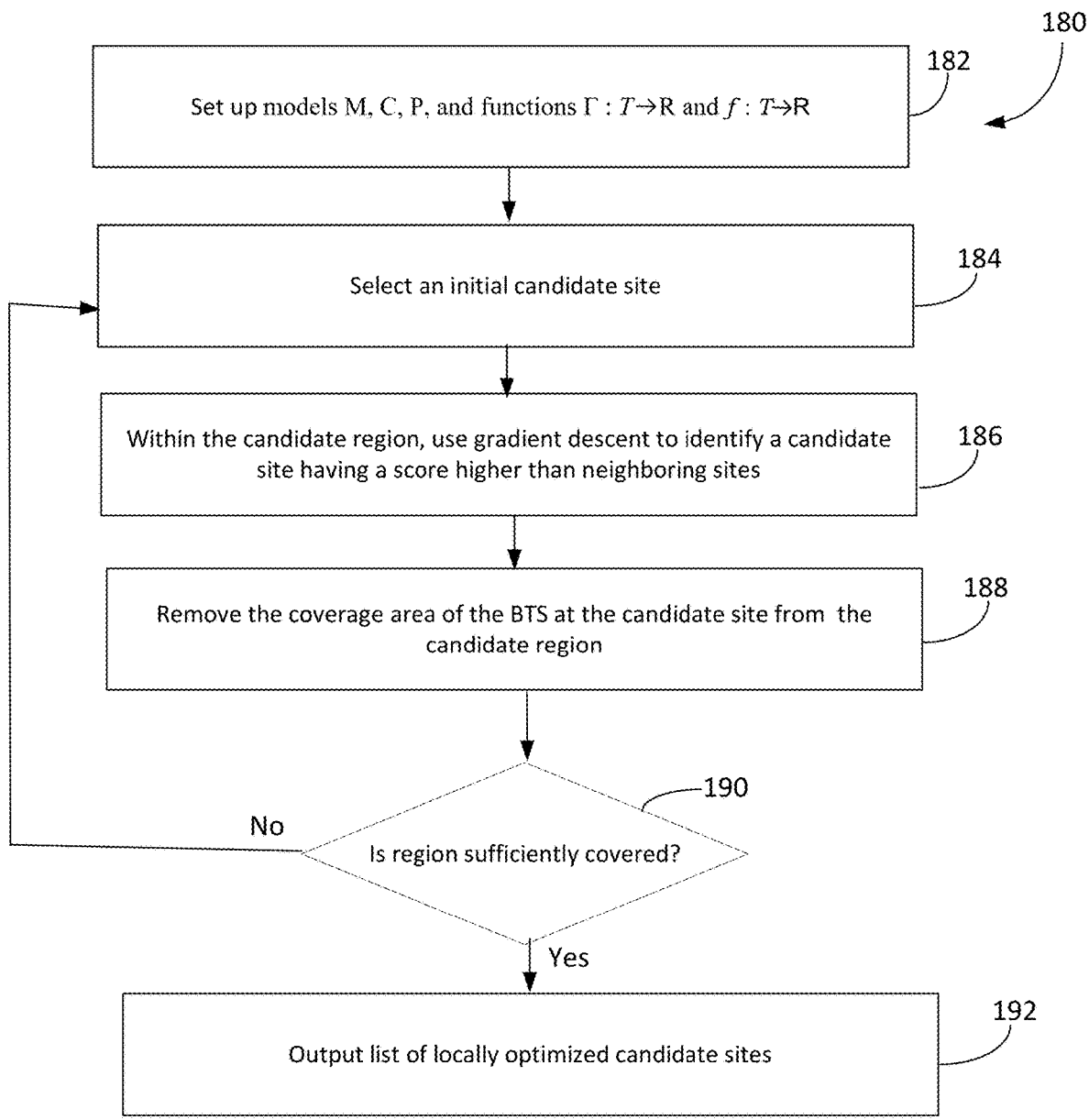
FIG. 9 is a flow diagram of a process for determining locally optimized candidate BTS sites.

FIG. 9 is a flow diagram of a process 180 for determining locally optimized candidate BTS sites. The process 180 can be implemented using, e.g., the local evaluation module 102 of FIG. 1. For example, the process 180 can include the following steps.

Step 182: Set up the models M, C, P, and functions Γ: T→ℝ and $f1$: T→ℝ.

Step 184: Choose an initial point $x_0$ within some appropriate interior of T as the initial candidate BTS site.

Step 186: Within the candidate region T, use gradient descent to identify a candidate site having a score higher than neighboring sites. For example, this step can include locating a "best neighbor" of $x_0$ among neighboring points $x_0^i$, 1≤i≤p chosen by any number of algorithms appropriate to the use case. This process continues until a point $x_j$, maximizing an $f1$ score among its neighbors, is located. The point $x_j$ is considered to be best among those points tested within the region immediately surrounding $x_1$ and is added to a list N.

Step 188: The set T is reduced: T=T\Γ($x_j$): the original region T where the points sufficiently covered by a hypothetical base transceiver station set up at the optimal point $x_j$ according to the coverage model Γ have been removed to reduce redundancy in the final selection. The resulting "best point" is again added to the list N, and so forth. Thus a candidate network N is grown by one for each iteration on the increasingly restricted target region T.

Step 190: A determination is made as to whether the region T is sufficiently covered. For example, the region is sufficiently covered when a pre-specified tolerance parameter is achieved. For example, the system 100 may continue to iterate until the total percentage of P covered by the vector of candidate points N according to F reaches, e.g. 90%. If the region T is sufficiently covered, the process 180 proceeds to step 192. If the region T is not sufficiently covered, the steps 184, 186, and 188 are repeated.

Step 192: The process 180 provides an output that includes a list of locally optimized candidate sites.

Figure 10:
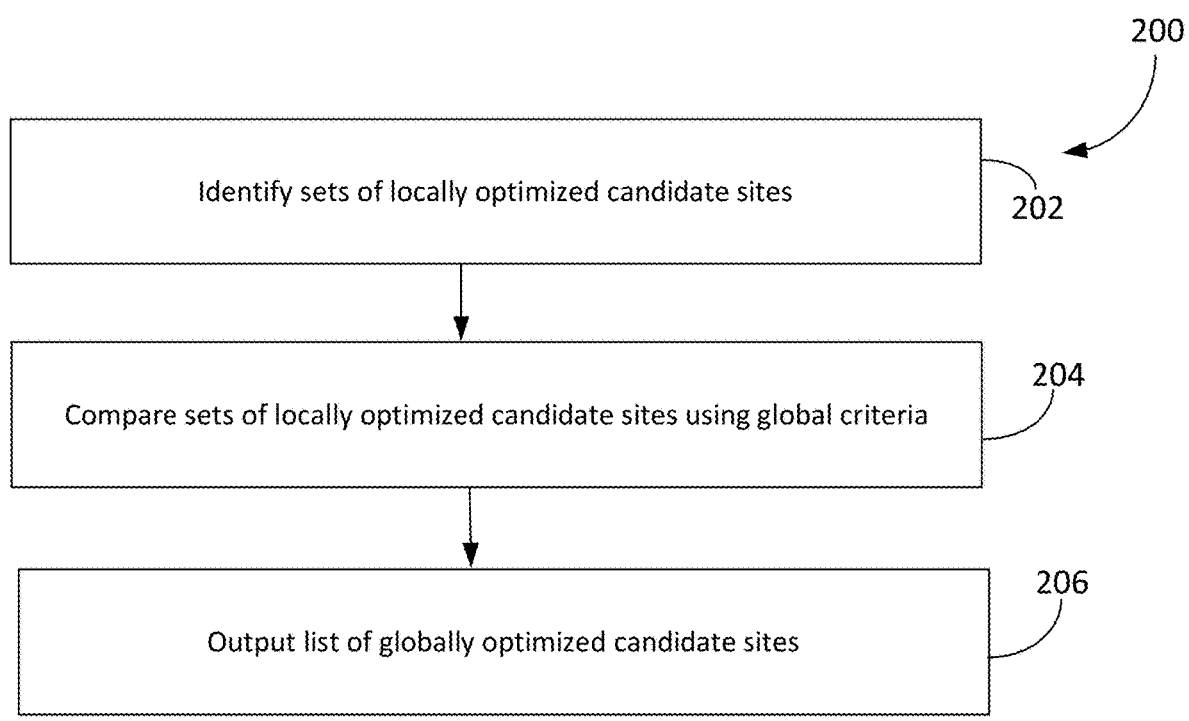
FIG. 10 is a flow diagram of a process for determining globally optimized candidate BTS sites.

FIG. 10 is a flow diagram of a process 200 for determining globally optimized candidate BTS sites. The process 200 can be implemented using, e.g., the global evaluation module 118 of FIG. 1. For example, the process 200 can include the following steps.

Step 202: Identify sets of locally optimized candidate sites. This step can be achieved using the process 180.

Figure 11B:
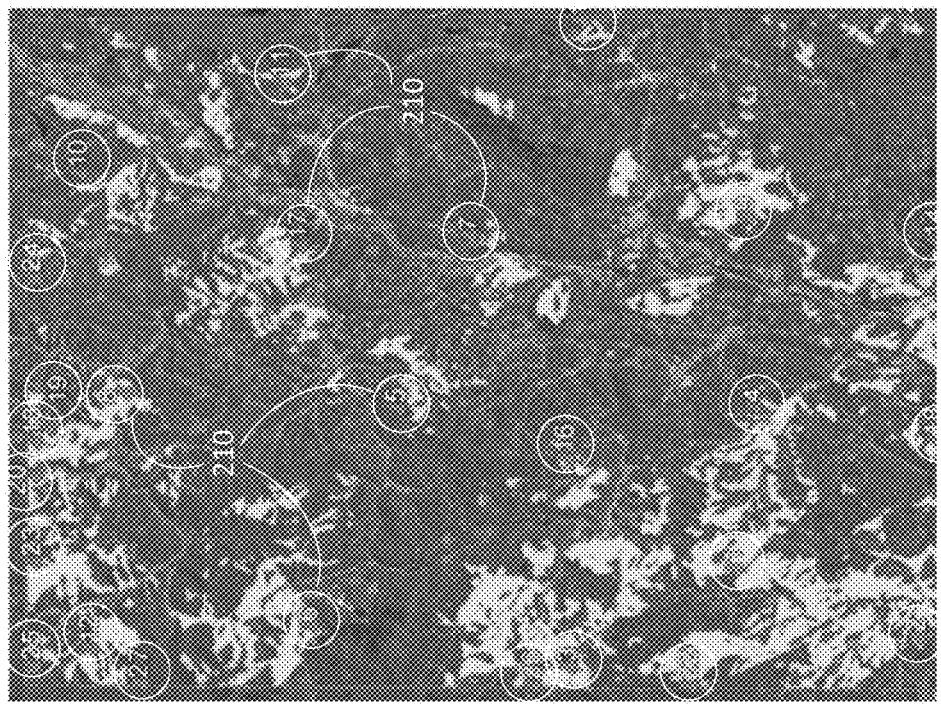
FIGS. 11A and 11B are graphs showing candidate BTS sties identified using the gradient descent process.
Figure 11A:
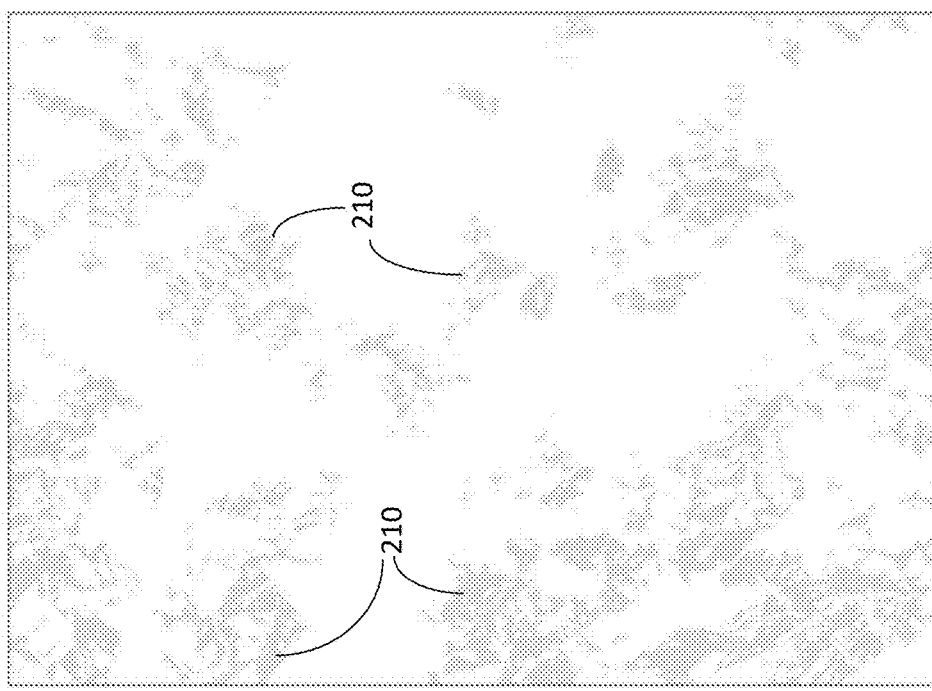

Step 204: Compare sets of locally optimized candidate sites using global criteria The following describes an example of optimized network planning in Vermont, U.S.A. The procedure described above was used in an effort to optimize the planning of a small cell network in Vermont. Using the open source GIS database together with census data available through data.gov we were able to map an optimal (or near optimal) network. Partial results of this effort are illustrated in FIGS. 11A and 11B. Referring to FIG. 11A, green (shown as light gray) regions 210 indicate coverage in which the wireless signal strength of dBm>−65 is achieved according to a coverage modeling software. Referring to FIG. 11B, candidate BTS sites 210 are marked with a pin, a number, and a circle. The number represents the sequence in which the candidate BTS sites were determined by the system. In this example, the evaluation function $f$ specifies evaluation based on two parameters: coverage and site count. In this example, the goal is to provide service to the maximum number of potential users per unit base transceiver station. For example, the evaluation function can be $f=P/Site\_count$.

Due to the computationally intense nature of running gradient descent over such fine grain datasets, we parallelize the procedure running many thousands of iterations simultaneously in a cloud-based parallel architecture using Spark managed map-reduce. Other implementation of the procedure outlined above can also use some form of parallelization to mitigate time complexity.

The process for establishing a small cell telecommunications network described above has many features and advantages. For example, a large portion of the international telecommunications market is held by large providers making use of powerful transmitters to bath large populated regions in wireless network access. These powerful transmitters have much higher power as compared to small cell base transceiver stations. Analysis of coverage optimization for macro scale sites (e.g., sites where powerful transmitters are located) is quantitatively different than that for small cell network planning. The process for optimizing coverage for macro scale sites, methodologies appropriate at those scales are not effectively applicable to networks of small cells. For network providers using primarily small cell base transceiver stations (e.g. solar powered transmitters), network design optimization attains priority status for medium sized target regions exhibiting relatively low population densities. Due to the historical marginal profitability of such operations, little investment has been reserved for the development of quantitative network design schemes such as the one presented here.

For small cell network providers, the need for optimized network design can distinguish a successful deployment because of the close relationship between profit and operational cost. In circumstances requiring a network with hundreds of nodes, designing the network based on human intuition will likely result in suboptimal performance. The process described above provides an automated scalable approach that in most cases provide better results.

The gradient descent process described above for planning wireless BTS sites can also be used to optimize other network designs, e.g. wireless internet networks, "large cell" telecommunications networks at a global scale, and fiber optics networks. To use the gradient descent method, one can first determine possible placements of network nodes, and an evaluation function to distinguish the selection of nodes. The gradient descent method can then be used to determine which nodes among the possible nodes will produce the optimal result based on the evaluation function.

In some implementations, the system 100 can include one or more processors and one or more computer-readable mediums (e.g., RAM, ROM, SDRAM, hard disk, optical disk, and flash memory). The one or more processors can perform various operations described above. The operations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Figure 12:
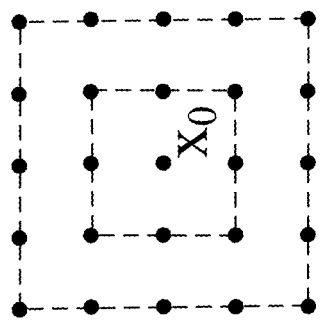
FIG. 12 is a diagram showing neighboring points of a point that is being evaluated.

A number of implementations of the invention have been described. Nevertheless, it will be understood that various modifications can be made without departing from the spirit and scope of the invention. In the example shown in FIG. 8A, the 8 points surrounding $x_0$, i.e., the corners and edge centers of a square centered at $x_0$, are selected as the neighboring points. Other choices of "neighboring points" can also be used. For example, referring to FIG. 12, the 24 points surrounding the point $x_0$ can be selected as the neighboring points. Weights can be applied to the neighboring points. In the example of FIG. 12, a higher weight can be applied to the 8 points closer to the point $x_0$, and a smaller weight can be applied to the 16 points farther away from the point $x_0$.

Accordingly, other embodiments are within the scope of the following claims.

What is claimed is:

1. A method for establishing a small cell telecommunications network, the method comprising:
   at at least one data processor, determining a first set of locations for establishing a plurality of small cell base transceiver stations to provide wireless cellular service, comprising:
      determining, within a first overall region, a first location that is associated with a higher score relative to neighboring locations, in which the score is calculated according to a first function of location that takes into account a specified parameter associated with a first coverage region that is expected to have wireless cellular service coverage provided by a first small cell base transceiver station if the first small cell base transceiver station is operated at the first location;
      determining the first coverage region that is expected to have wireless cellular service coverage provided by the first small cell base transceiver station if the first small cell base transceiver station operated at the first location;
      determining, within a second overall region, a second location that is associated with a higher score relative to neighboring locations, in which the score is calculated according to the first function that takes into account the specified parameter associated with a second coverage region that is expected to have wireless cellular service coverage provided by a second small cell base transceiver station if the second small cell base transceiver station is operated at the second location, and the second overall region is equal to the first overall region excluding the first coverage region; and
      adding the first and second locations to the first set of locations.

2. The method of claim 1 in which the first function also takes into account of a cost associated with the small cell base transceiver station.

3. The method of claim 1 in which the specified parameter associated with the first coverage region comprises an estimated number of people in the first coverage region that is expected to have wireless cellular service coverage provided by the first small cell base transceiver station if the first small cell base transceiver station is operated at the first location.

4. The method of claim 1 in which the specified parameter associated with the second coverage region comprises an estimated number of people in the second coverage region that is expected to have wireless cellular service coverage provided by the second small cell base transceiver station if the second small cell base transceiver station is operated at the second location.

5. The method of claim 1 in which determining the first coverage region comprises determining the first coverage region based on a model that describes a geographic topography of the first overall region, and information about radio frequency signal propagation and loss.

6. The method of claim 1 in which determining the first location comprises applying a gradient descent process to the first function to determine the first location that is associated with a local maximum score or an approximate local maximum score.

7. The method of claim 6 in which the gradient descent process comprises a discrete gradient descent process.

8. The method of claim 1 in which the first function is based on a parameter that represents a population in the wireless signal coverage region of the small cell base transceiver station, a parameter that represents the operational cost of the small cell base transceiver station, and a parameter that represents an estimated number of wireless devices that will use the service provided by the small cell base transceiver station per person in the wireless signal coverage region.

9. The method of claim 1 in which at least a portion of the first function of location x, denoted by $f1(x)$, is represented by $$f1(x)=P*M/C,$$

in which the parameter P represents a population in the wireless signal coverage region of the small cell base transceiver station, the parameter C represents the operational cost of the small cell base transceiver station, and the parameter M represents an estimated number of wireless devices that will use the service provided by the small cell base transceiver station per person in the wireless signal coverage region.

10. The method of claim 1 in which when determining the score for the second location, the first function takes into account of a likelihood of successful handoff between a base transceiver station at location the second location and at least one other base transceiver station.

11. The method of claim 1 in which the first function of location x, denoted by $f1(x)$, is represented by $$f1(x)=(P*M/C+D)*(V/v-1),$$

in which the parameter P represents a population in the wireless signal coverage region (denoted by a parameter S) of the small cell base transceiver station, the parameter C represents the operational cost of the small cell base transceiver station, the parameter M represents an estimated number of wireless devices that will use the service provided by the small cell base transceiver station per person in the wireless signal coverage region S, the parameter D represents a case specific factor, the parameter v represents a minimum overlap in coverage necessary for successful handoff between the small cell base transceiver station and another station, and the parameter V represents a maximum overlap between the wireless signal coverage region S and the wireless signal coverage regions of small cell base transceiver stations established at locations, if any, that have already been determined.

12. The method of claim 1 in which determining the first set of locations comprises:
   determining a second coverage region that is expected to have wireless cellular service coverage provided by the second small cell base transceiver station if the second small cell base transceiver station is established and operated at the second location;
   determining, within a third overall region, a third location that is associated with a higher score relative to neighboring locations, in which the score is calculated according to the first function that takes into account an estimated number of people in a third coverage region that has wireless cellular service coverage provided by a third small cell base transceiver station if the third small cell base transceiver station is established and operated at the third location, and the first function also takes into account of the cost associated with the third small cell base transceiver station, and the third overall region is equal to the second overall region excluding the second coverage region; and
   adding the third location to the first set of locations.

13. The method of claim 12 in which determining the first set of locations comprises:
   iteratively determining locations for additional small cell base transceiver stations, comprising:
      determining an (i−1)-th coverage region that is expected to have wireless cellular service coverage provided by an (i−1)-th small cell base transceiver station if the (i−1)-th small cell base transceiver station is established and operated at the (i−1)-th location, i being an integer from 4 to n, n being an integer larger than 4;
      determining, within an i-th overall region, an i-th location that is associated with a higher score relative to neighboring locations, in which the score is calculated according to the first function that takes into account an estimated number of people in an i-th coverage region that is expected to receive wireless cellular service coverage provided by an i-th small cell base transceiver station if the i-th small cell base transceiver station is established and operated at the i-th location, and the first function also takes into account of a cost associated with the i-th small cell base transceiver station, and the i-th overall region is equal to the (i−1)-th overall region excluding the (i−1)-th coverage region; and
      adding the i-th location to the first set of locations.

14. The method of claim 13 in which determining the first set of locations comprises:
   ending the iterative determination of the locations for the additional small cell base transceiver stations when an overall coverage of the i small cell base transceiver stations reaches a predetermined threshold.

15. The method of claim 14, comprising:
   determining a second set of j locations for establishing a plurality of small cell base transceiver stations to provide wireless cellular service, in which an overall coverage of the j small cell base transceiver stations reaches the predetermined threshold, and at least one of the locations in the second set of j locations is different from the locations in the first set of i locations;
   applying a network evaluation function to the first set of i locations to generate a first network score, in which the network evaluation function takes into account of a cost associated with microwave links for interconnecting the small cell base transceiver stations established at the first set of i locations;
   applying the network evaluation function to the second set of j locations to generate a second network score, in which the network evaluation function takes into account of the cost associated with microwave links for interconnecting the small cell base transceiver stations established at the second set of j locations;
   comparing the first network score to the second network score; and
   generating an output having information about one of the first and second sets of locations that has a higher network score.

16. The method of claim 15, comprising:
   iteratively determining additional sets of locations for establishing a plurality of small cell base transceiver stations to provide wireless cellular service;
   applying the network evaluation function to the additional sets of locations to generate corresponding network scores;
   determining which set of locations among the sets of locations has the highest network score; and
   outputting information about the set of locations that has the highest network score.

17. The method of claim 16, comprising establishing small cell base transceiver stations at the locations in the set of locations that has the highest network score.

18. The method of claim 15 in which the network evaluation function takes into account of the number of transactions captured by the set of small cell base transceiver stations per unit time, the cost associated with microwave links that interconnect the small cell base transceiver stations, and a cost associated with backhaul connections for supporting the small cell base transceiver stations.

19. The method of claim 15 in which the network evaluation function, denoted by $f2$, is represented by:

$$f2(X) = T_X/(C_M * C_B + D_0) + D,$$

wherein the parameter X represents the set of small cell base transceiver stations being evaluated, the parameter $T_X$ represents the number of transactions captured by the set of small cell base transceiver stations X per unit time, the parameter $C_M$ represents the general cost associated with M microwave links that interconnect the small cell base transceiver stations X, the parameter $C_B$ represents the operating cost of B backhaul connections for supporting the small cell base transceiver stations X, and the parameters $D_0$, D represent additional case specific factors.

20. The method of claim 1, comprising receiving information about coordinates of lattice points in the first overall region,
   wherein determining within the first overall region the first location that is associated with the higher score relative to neighboring locations comprises determining among the lattice points within the first overall region a first lattice point that is associated with a higher score relative to neighboring lattice points, in which the score is calculated according to the first function that takes into account an estimated number of people in the first coverage region that is expected to have wireless cellular service coverage provided by the first small cell base transceiver station if the first small cell base transceiver station is established and operated at the first lattice point.

21. The method of claim 20 in which at least some of the lattice points comprise points on a regular grid.

22. The method of claim 20 in which at least some first lattice points have a first lattice density, and at least some second lattice points have a second lattice density that is different from the first lattice density.

23. The method of claim 22 in which a more sparsely populated lattice is used for a flatter terrain where microwave signals propagate a farther distance, and a more densely populated lattice is used for a steeper terrain where microwave signals propagate a shorter distance.

24. A method for establishing a small cell telecommunications network to provide wireless service to at least a portion of a geographical region, the method comprising:
at at least one data processor, determining a plurality of candidate sets of locations in the geographical region, in which each candidate set includes candidate locations for establishing small cell base transceiver stations to provide wireless cellular service, and each location in the candidate set of locations is determined by applying a gradient descent process to a first function of location that takes into account an utility and a cost associated with a small cell base transceiver station at the location;
at the at least one data processor, applying a second function to each of the plurality of candidate sets of locations to generate an evaluation score for each candidate set of locations, in which the second function takes into account an utility and a cost associated with small cell base transceiver stations at the candidate set of locations;
selecting, from the candidate sets of locations, a candidate set of locations that has a highest evaluation score; and
generating an output that includes information about the candidate set of locations that has the highest evaluation score.

25. The method of claim 24, comprising establishing small cell base transceiver stations at the locations in the candidate set of locations that has the highest evaluation score.

26. The method of claim 24 in which the gradient descent process comprises a discrete gradient descent process.

27. The method of claim 24 in which determining each candidate set of at least some of the candidate set of locations comprises iteratively applying the gradient descent process to the first function of location, and the iterative application of the gradient descent process comprises:
at a first iteration, selecting a starting location within the geographical region, and applying the gradient descent process to the first function of location to determine a first location that is associated with a local maximum or an approximate local maximum of the first function.

28. The method of claim 27 in which the iterative application of the gradient descent process comprises:
at a second iteration, determining a first coverage region that is expected to have wireless cellular service coverage provided by a first small cell base transceiver station if the first small cell base transceiver station is established and operated at the first location;
selecting a starting location within a second overall region that includes the geographical region excluding the first coverage region, and applying the gradient descent process to the first function of location to determine, within the second overall region, a second location that is associated with a local maximum or an approximate local maximum of the first function.

29. The method of claim 28 in which the iterative application of the gradient descent process comprises:
at an i-th iteration, determining an (i−1)-th coverage region that is expected to have wireless cellular service coverage provided by an (i−1)-th small cell base transceiver station if the (i−1)-th small cell base transceiver station is established and operated at the (i−1)-th location, i being an integer from 3 to n, n being an integer larger than 3; and
selecting a starting location within an i-th overall region that includes the (i−1)-th overall region excluding the (i−1)-th coverage region, and applying the gradient descent process to the first function to determine, within the i-th overall region, an i-th location that is associated with a local maximum or an approximate local maximum of the first function.

30. A method for establishing a small cell telecommunications network to provide wireless service to at least a portion of a geographical region, the method comprising:
at at least one data processor, determining a candidate set of locations in the geographical region, in which the candidate set includes candidate locations for establishing small cell base transceiver stations to provide wireless cellular service, and each candidate location is determined by applying a gradient descent process to a first function of location that takes into account an utility and a cost associated with a small cell base transceiver station at the location;
wherein the first function is based on a parameter that represents a population in the wireless signal coverage region of the small cell base transceiver station, a parameter that represents the operational cost of the small cell base transceiver station, and a parameter that represents an estimated number of wireless devices that will use the service provided by the small cell base transceiver station per person in the wireless signal coverage region.

31. The method of claim 30 in which the gradient descent process comprises a discrete gradient descent process.

32. The method of claim 30, further comprising:
at the at least one data processor, applying a second function to each of a plurality of candidate sets of locations to generate an evaluation score for each candidate set of locations, in which the second function takes into account an utility and a cost associated with small cell base transceiver stations at the candidate set of locations;
selecting, from the candidate sets of locations, a candidate set of locations that has a highest evaluation score; and
generating an output that includes information about the candidate set of locations that has the highest evaluation score.

33. The method of claim 32, comprising establishing small cell base transceiver stations at the locations in the candidate set of locations that has the highest evaluation score.

34. A system for establishing a small cell telecommunications network, the system comprising:
a storage device configured to store information about an expected coverage function, an evaluation function, a topography model, an existing coverage model, and a population model; and a local evaluation module configured to apply the expected coverage function and the evaluation function to information derived from the topography model, the existing coverage model, and the population model in order to evaluate candidate locations for building small cell base transceiver stations.

35. The system of claim 34 in which the local evaluation module is configured to:
apply the expected coverage function to information derived from the topography model to determine a first coverage region that is expected to have wireless cellular service coverage provided by a first small cell base transceiver station if the first small cell base transceiver station is operated at a first location within a first overall region, and
apply the evaluation function to the first coverage region and the population model to determine a score representing a feasibility of operating the first small cell base transceiver station at the first location.

36. The system of claim 34 in which the local evaluation module is configured to determine a first set of locations for establishing a plurality of small cell base transceiver stations to provide wireless cellular service, comprising:
determine, within a first overall region, a first location that is associated with a higher score relative to neighboring locations, in which the score is calculated according to the evaluation function that takes into account a specified parameter associated with a first coverage region that is expected to have wireless cellular service coverage provided by a first small cell base transceiver station if the first small cell base transceiver station is operated at the first location;
determine the first coverage region that is expected to have wireless cellular service coverage provided by the first small cell base transceiver station if the first small cell base transceiver station operated at the first location;
determine, within a second overall region, a second location that is associated with a higher score relative to neighboring locations, in which the score is calculated according to the evaluation function that takes into account the specified parameter associated with a second coverage region that is expected to have wireless cellular service coverage provided by a second small cell base transceiver station if the second small cell base transceiver station is operated at the second location, and the second overall region is equal to the first overall region excluding the first coverage region; and
add the first and second locations to the first set of locations.

37. A non-transitory computer-readable medium storing instructions that when executed by at least one computer, cause the at least one computer to perform a process for establishing a small cell telecommunications network, the process comprising:
determining a first set of locations for establishing a plurality of small cell base transceiver stations to provide wireless cellular service, comprising:
determining, within a first overall region, a first location that is associated with a higher score relative to neighboring locations, in which the score is calculated according to a first function of location that takes into account a specified parameter associated with a first coverage region that is expected to have wireless cellular service coverage provided by a first small cell base transceiver station if the first small cell base transceiver station is operated at the first location;
determining the first coverage region that is expected to have wireless cellular service coverage provided by the first small cell base transceiver station if the first small cell base transceiver station operated at the first location;
determining, within a second overall region, a second location that is associated with a higher score relative to neighboring locations, in which the score is calculated according to the first function that takes into account the specified parameter associated with a second coverage region that is expected to have wireless cellular service coverage provided by a second small cell base transceiver station if the second small cell base transceiver station is operated at the second location, and the second overall region is equal to the first overall region excluding the first coverage region; and
adding the first and second locations to the first set of locations.

* * * * *